T. D. MILLEA.
PRESSURE REGULATING VALVE.
APPLICATION FILED AUG. 16, 1915.

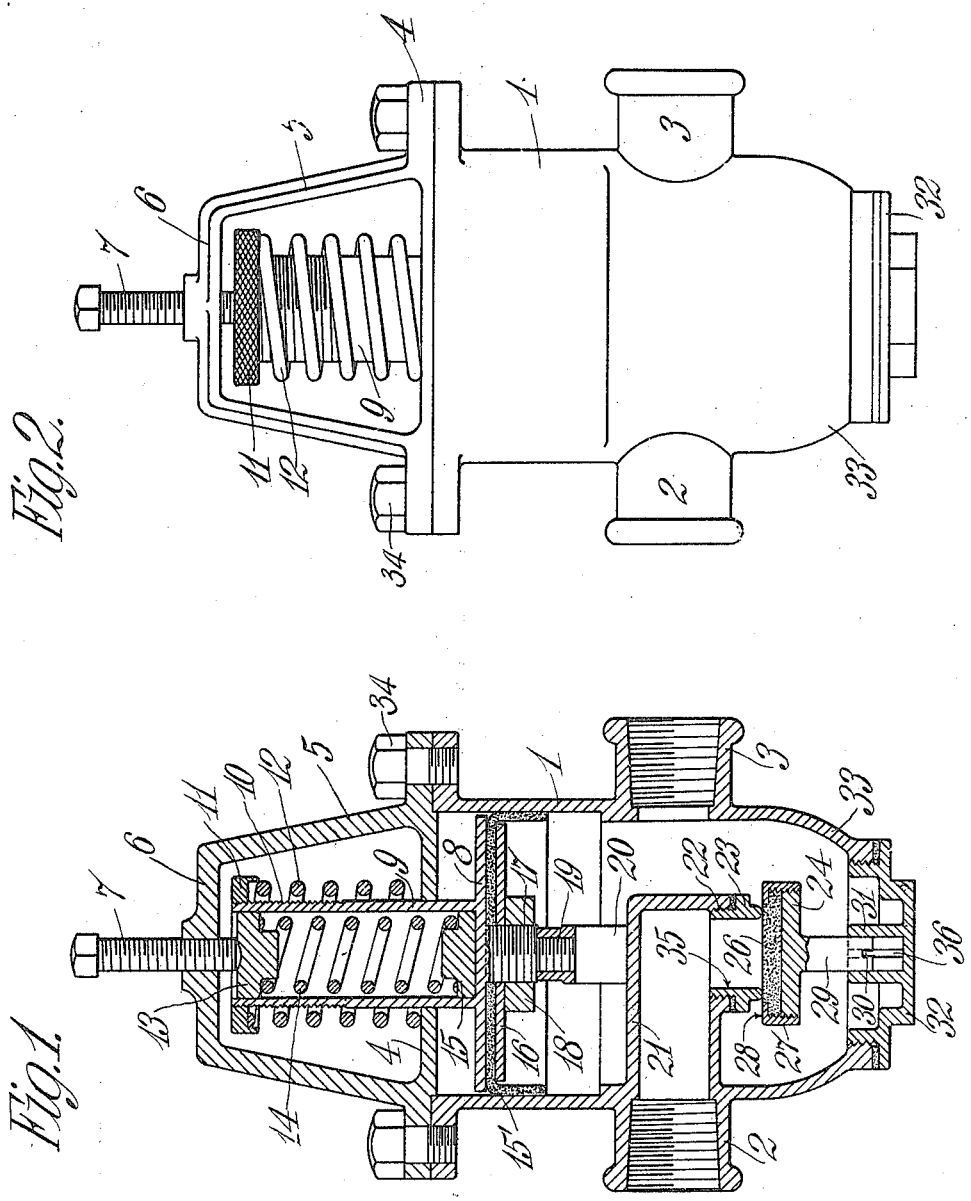

1,196,377.

Patented Aug. 29, 1916.
2 SHEETS—SHEET 2.

WITNESS
F. E. Hartwell.

INVENTOR.
Thomas D. Millea.
BY
Harry W. Bowen.
ATTORNEYS.

UNITED STATES PATENT OFFICE.

THOMAS D. MILLEA, OF SPRINGFIELD, MASSACHUSETTS, ASSIGNOR, BY MESNE ASSIGNMENTS, TO TRY-ME MANUFACTURING COMPANY, A CORPORATION OF MASSACHUSETTS.

PRESSURE-REGULATING VALVE.

1,196,377.

Specification of Letters Patent.    Patented Aug. 29, 1916.

Application filed August 16, 1915.  Serial No. 45,729.

*To all whom it may concern:*

Be it known that I, THOMAS D. MILLEA, a citizen of the United States of America, residing in the city of Springfield, county of Hampden, and State of Massachusetts, have invented certain new and useful Improvements in Pressure-Regulating Valves, of which the following is a specification.

This invention relates to a new and useful improvement in pressure regulating valves.

An object of the invention is to provide a device that is particularly designed for regulating the pressure of fluid or air in the service pipes of a building, whereby the pressure therein is maintained practically constant, without regard to the pressure in the street service mains.

A further object is to provide a pressure regulating device which can be used as a shut-off without disturbing the main shut-off valve.

A further object is to provide a device that does away with the use of the sand catcher device which is usually employed in connection with pressure regulating and reducing valves.

A further object is to provide a device which will prevent what is known as "water hammer" when the valve closes to its seat in shutting off the flow.

A further object is to automatically maintain the pressure and automatically control the volume.

Further objects and nature of the invention will appear more fully in the body of the specification and be particularly pointed out in the claims.

Figure 4:
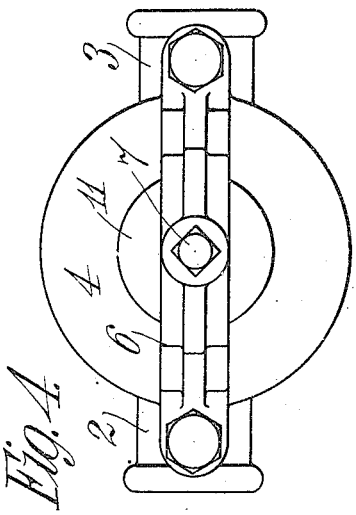
Figure 5:
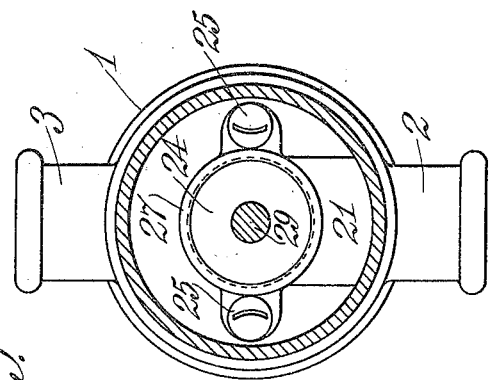
Figure 3:
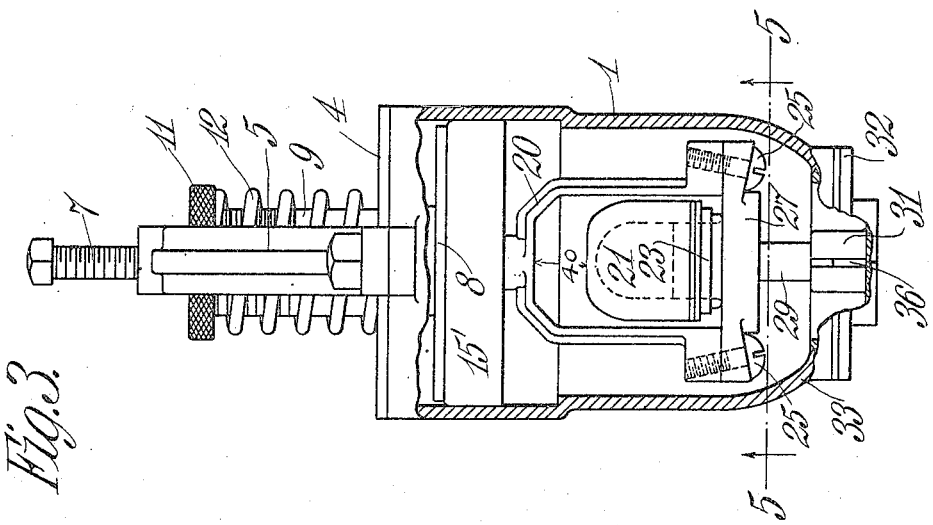

Referring to the drawings: Figure 1 is a vertical sectional view through the valve stem and pipe connections of Fig. 2, showing the means for adjusting the compensating and pressure springs also the nut and spring for closing the valve; Fig. 2 is a side elevational view of the exterior of the pressure regulating device; Fig. 3 is a partial vertical sectional view taken in a plane at right angles to the view shown in Fig. 1 and illustrating the yoke that carries the valve and to which the compensating spring is connected; Fig. 4 is a top plan view of the exterior of the pressure regulating device; and Fig. 5 is a horizontal sectional view on the line 5—5 of Fig. 3, looking upward in the direction of the arrows.

Referring to the drawings in detail: 1 designates the main casing having the threaded extensions 2 and 3 to which the supply and service pipes, respectively, are connected.

4 designates a plate which is secured to and closes the upper end of the casing 1. Extending upwardly from this plate is a yoke-shaped member 5 which is formed with a horizontal portion 6 in which is located an adjusting screw 7.

8 is a disk-shaped member having an upwardly extending barrel part 9, the upper external end of which is formed with threads 10 to receive a nut 11. Located between the lower side of the nut 11 and the upper side of the plate 4 is a coil spring 12. Located within the barrel part 9 and the follower 13 is a second coil spring 14. The lower end of this spring bears on a foot piece 15 which rests on the upper surface of the plate 8. This plate or disk 8 in turn rests upon the piston packing 15′ which is clamped between the plate 8 and the disk 16. The plate 8 is formed with a threaded extension portion 17 on which is placed a nut 18 whereby when the nut 18 is turned up tightly against the plate 16 the piston packing 15″ will be rigidly clamped. The end of the extension portion 17 is turned down as shown at 19 and threaded. To this threaded part is attached a yoke 20, shown clearly in Fig. 3. This yoke spans the inwardly projecting entrance tube 21 through which the fluid or air flows as it enters the reducing valve. This casing has an interiorly threaded part 22 at its orifice in the lower side thereof to which the valve seat 23 is screwed.

The valve is composed of the members or parts 24, 26, 27, and 28, and is attached to the yoke 20 by means of the screws 25. The packing for the valve is indicated at 26 and is secured in place by means of the L-shaped ring 27, the inturned portion 28 of which engages or clamps the edge 28 of the packing 26. The valve is formed with a downwardly extending stem 29 that is formed with a groove 30 in which a screw driver or other suitable tool may be inserted for separating the members of the valve if desired. This stem 29 is guided in its vertical movements by means of the bored out barrel-shaped part 31 that is made integral with the cap 32, which cap is threaded or otherwise secured in the lower depending portion 33 of the valve casing, as clearly shown in Fig. 1. The plate 4 is secured to the casing 1 by means of the machine bolts 34.

The operation of this valve may be described as follows: It should be stated that the orifice discharge opening 35 need not be of a definite or fixed diameter, and the diameter of the casing 1 in which the piston 15 works need not necessarily be of a definite or fixed diameter. The rate, as measured in volume, at which the fluid or air will pass through the valve will depend of course upon the distance that the valve opens to allow the fluid or air to pass from the high to the low pressure side, that is to say the valve is adapted to be adjusted to a quantity flow. If the set screw 7 is turned backward so that the spring 14 is under a very slight compression and the spring 12 is under a great compression the valve will be opened very much less allowing the water to flow through the valve at a lesser rate by reason of the valve moving a shorter distance away from its seat. It should be stated that the valve opens with the flow of the fluid or air from the supply side; the closing of the valve being assisted by the spring 12 which may be considered a compensating spring for the purpose of controlling the volumetric flow of the fluid or air. The spring 12, together with the nut 11 can be used to tightly close the valve on to its seat by simply threading the nut 11 downward on the threaded part 10 of the barrel part 9, thereby causing this part to be lifted, which in turn through the yoke 20, will move the valve tightly to its seat, and thus could be used as a shut-off.

It will, therefore, be seen that the movements of the piston 15 and shut-off valve will depend upon the adjustments of the springs 12 and 14. When a faucet is opened on the service side of the valve the pressure on that side is reduced, the spring 14 together with the pressure of the water from the supply side will cause the valve to open, the extent of opening being determined by the adjustment of the spring 12. The adjustment of the spring 12, therefore, determines the rate of flow of liquid through the valve when a faucet or other outlet opening on the service side is opened. The spring 12, together with the pressure on the larger area, as shown at 16, will act to move the valve to its seat against the pressure of the water on the supply side.

An important feature of the present construction is that the valve for closing the orifice 35 is completely surrounded by pressure during the flow of the fluid through the device and in this way serves to balance the valve. This chamber also acts as a receptacle for sand, etc., and if there is any sediment or other accumulation in the bottom of the casing 1, it will be readily washed forward through the discharge opening 3. The inlet cylindrical tube 21 which is in the axial line of the inlet and discharge connections is located sufficiently high above the depending part 33 so that the valve has plenty of room for its vertical movements, the extent of travel being indicated by the space 40 between the lower end of the part 19 and upper side of the inlet cylindrical tube 21.

In order to wash away any sediment or other foreign substances which might collect below the stem 29 in the barrel part 31, oppositely disposed openings 36 are provided to allow the water or other fluid to freely flow through the part 31, as readily understood.

A suitable draw off or pet cock device, if desired, may be attached to the cap 32 below the depending part 29 for the purpose of permitting any sediment or foreign matter to escape.

It should be stated that the spring 12 is weaker than spring 14. By adjusting these two springs, one relative to the other, any desired pressure and volumetric flow may be obtained. It should also be stated that the adjustment of the springs 12 and 14 can be so made as to cause the valve 26 and piston 16 to assume a floating action and the control of the valve be made entirely by the difference in area of the outlet 35 and piston 16. When the springs 12 and 14 are so adjusted as to cause the valve to assume a floating action the closure of the outlet 3 by means of a cock or faucet will move against the incoming pressure. This pressure will act on the larger surface 16 and bring the valve gently to its seat without any hammering effect as readily understood. The valve is, furthermore, not restricted in its travel since the space 40, see Fig. 3, allows ample freedom of movements.

What I claim is:

1. In a fluid or air pressure reducing apparatus, the combination, with an inclosing casing, a piston located therein, a valve for controlling the flow of fluid or air through the casing, connecting means between the piston and the valve, and a compensating device comprising two springs whose expansive forces act in opposite directions and arranged in concentric relation to each other for varying the extent of opening movement of the valve.

2. In a fluid and air pressure reducing device, the combination, with an inclosing casing, a piston therein, a valve for controlling the flow of fluid or air through the casing, connecting means between the piston and the valve, means for maintaining the piston and the valve in alinement, a plate located above the piston and formed with a barrel-shaped part, a spring located within said part for assisting the opening movements of the valve in the direction of the flow of the fluid or air, means for varying the tension of the spring, a second spring co-acting with the barrel-shaped part, a nut on said part and bearing upon the end of the second spring, said nut being for the purpose of varying the tension of the second spring for moving the valve toward its seat and against the tension of the first mentioned spring.

3. In a fluid or air pressure regulating or controlling device, the combination with an inclosing casing having a depending portion, a cap for closing the lower end of the casing, said cap having a bored out portion, a valve formed with an extension which is located within said bored-out portion, a piston, a yoke connecting the piston and valve, and means for moving the valve permanently to its seat.

4. In a pressure reducing device, the combination with a casing member formed with inlet and outlet pipe connections, a fluid or air receiving tube extending into the casing, a piston having a barrel portion, a spring surrounding the same, a valve connected thereto for controlling the flow of the liquid through the tube and casing, a plate formed with a depending threaded portion, a yoke connected to the threaded portion and to the valve, said yoke spanning the inlet tube and means comprising a spring located in the barrel portion for controlling the extent of opening of the valve.

5. In a pressure-reducing device, the combination, a casing formed with supply and service pipe connections, a tube extending into the casing and having an outlet orifice located in the casing, a valve for controlling the outlet orifice, a piston connected to the valve, a hollow member extending upward from the piston, a spring located therein for varying the extent of downward movement of the piston, a cover plate secured to the upper end of the casing, a spring resting on the upper surface of the cover plate, and means comprising a threaded nut engaging the cylindrical member for varying the compression of the said last mentioned spring, whereby the valve may be moved toward its seat to effect a permanent shut-off, as described.

6. In a pressure and volumetric regulating valve, the combination, a casing, an inlet tube, a valve for closing the tube, said valve opening in the direction of the pressure and flow of the fluid or air, a spring in line with the valve for assisting the opening of the valve, a piston of larger area than the valve, located in the casing and connected to the valve and arranged in the same axial line as the valve, a second spring connected to the piston for closing the valve, means for adjusting the springs for varying the volumetric flow and the pressure of the fluid, without varying the area of the inlet orifice, whereby a volumetric flow is obtained.

7. A fluid or air pressure regulating device, comprising a casing having inlet and outlet openings, an inlet tube, a valve for closing the tube, a piston of larger area than the inlet tube and connected to the valve and means above the piston comprising two oppositely acting springs arranged in concentric relation to each other for causing the piston and valve to assume a floating or balanced condition, whereby when the outlet side of the casing is closed the valve will be moved to its seat by the piston of larger area, against the flow and pressure of the incoming fluid or air with a cushioning effect for preventing hammering of the fluid or air, as described.

8. In a pressure and volumetric regulating valve, the combination, a casing having inlet and outlet connections, a leading-in tube for the supply, a valve for controlling the outlet end of the tube, a piston of larger area than the valve, connecting means between the valve and piston, concentrically arranged means acting in opposite directions on the piston and valve to control their movements, said means serving first to effect a permanent closure of the valve, second, for causing the pressure to remain constant and the rate or volume of flow to vary, third, for causing the volume to vary and the pressure to remain constant, and fourth, to place the piston and valve in a floating condition for preventing fluid hammering during the closing movements, as described.

9. In a pressure and volumetric regulating valve, the combination, a casing, an inlet tube, a valve for closing the tube, said valve opening in the direction of the pressure and flow of the fluid or air, a spring in line with the valve for assisting the opening of said valve, a piston of larger area than the valve located in the casing in line with the valve and connected to the valve, a second spring surrounding the first spring and connected to the piston for closing the valve, means for adjusting the springs for varying the volumetric flow and the pressure of the fluid, without varying the area of the inlet orifice, whereby a volumetric flow is obtained.

10. In a fluid and air pressure reducing device, the combination with an inclosing casing, a piston therein, a valve for controlling the flow of fluid or air through the casing, connecting means between the piston and the valve, means for maintaining the piston and the valve in alinement, a plate located above the piston and formed with a barrel-shaped part, a spring for assisting the opening movements of the valve in the direction of the flow of the fluid or air, means for varying the tension of the spring, a second spring coöperating with the barrel-shaped part, a nut on said part and bearing upon the end of the second spring, said nut being for the purpose of varying the tension of the second spring for moving the valve toward its seat and against the tension of the first mentioned spring.

11. In a pressure and volumetric regulating valve, the combination, a casing, an inlet tube, a valve for closing the tube, said valve opening in the direction of the pressure and flow of the fluid or air, a spring for assisting the opening of said valve, a piston of larger area than the valve, and connected to the valve, a second spring surrounding the first spring and connected to the piston for closing the valve, means for adjusting the springs for varying the volumetric flow and the pressure of the fluid, without varying the area of the inlet orifice whereby a volumetric flow is obtained.

THOMAS D. MILLEA.

Copies of this patent may be obtained for five cents each, by addressing the "Commissioner of Patents, Washington, D. C."